(12) United States Patent
Peng

(10) Patent No.: US 9,294,003 B2
(45) Date of Patent: Mar. 22, 2016

(54) TRANSFORMER-LESS UNIFIED POWER FLOW CONTROLLER

(71) Applicant: Board of Trustees of Michigan State University, East Lansing, MI (US)

(72) Inventor: Fang Zheng Peng, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 14/380,631

(22) PCT Filed: Feb. 22, 2013

(86) PCT No.: PCT/US2013/027271
§ 371 (c)(1),
(2) Date: Aug. 22, 2014

(87) PCT Pub. No.: WO2013/126660
PCT Pub. Date: Aug. 29, 2013

(65) Prior Publication Data
US 2015/0029764 A1   Jan. 29, 2015

Related U.S. Application Data

(60) Provisional application No. 61/602,915, filed on Feb. 24, 2012.

(51) Int. Cl.
*H02M 7/515* (2007.01)
*H02M 7/487* (2007.01)
(Continued)

(52) U.S. Cl.
CPC ............ *H02M 5/458* (2013.01); *H02J 3/1814* (2013.01); *H02M 7/49* (2013.01); *H02J 3/1857* (2013.01); *H02M 2007/4835* (2013.01); *Y02E 40/18* (2013.01); *Y02E 40/26* (2013.01)

(58) Field of Classification Search
CPC . H02M 7/5155; H02M 7/487; H02M 7/5387; H02M 5/4585; H02M 7/49; H02J 3/1857
USPC .................. 363/37, 136, 137, 132, 65, 71, 72
See application file for complete search history.

(56) References Cited

U.S. PATENT DOCUMENTS 3,423,662 A   1/1969   Schlabach et al.
3,444,451 A   5/1969   Schlabach et al.
(Continued)

FOREIGN PATENT DOCUMENTS

CA   811818 A   4/1969
CA   852830 A   9/1970
(Continued)

OTHER PUBLICATIONS

Alesina, Alberto et al., Solid-State Power Conversion: A Fourier Analysis Approach to Generalized Transformer Synthesis, IEEE Transactions on Circuits and Systems, vol. CAS-28, No. 4, Apr. 1981.
(Continued)

*Primary Examiner* — Timothy J Dole
*Assistant Examiner* — Sisay G Tiku
(74) *Attorney, Agent, or Firm* — Harness, Dickey & Pierce, P.L.C.

(57) ABSTRACT

A power control device includes a first terminal, a second terminal connected to a transmission line, a first cascade multilevel inverter (CMI) and a second CMI. The first CMI is connected to the second terminal. The second CMI connected in series between the first terminal and the second terminal.

35 Claims, 13 Drawing Sheets

(51) Int. Cl.
  *H02M 7/5387* (2007.01)
  *H02M 7/49* (2007.01)
  *H02M 5/458* (2006.01)
  *H02J 3/18* (2006.01)
  *H02M 7/483* (2007.01)

(56) References Cited

U.S. PATENT DOCUMENTS

| | | |
|---|---|---|
| 3,448,300 A | 6/1969 | Gyugyi |
| 3,469,170 A | 9/1969 | Gyugyi |
| 3,470,447 A | 9/1969 | Gyugyi et al. |
| 3,526,789 A | 9/1970 | Gyugyi et al. |
| 3,568,033 A | 3/1971 | Gyugyi |
| 3,585,485 A | 6/1971 | Gyugyi et al. |
| 3,585,489 A | 6/1971 | Pelly et al. |
| 3,641,417 A | 2/1972 | Gyugyi |
| 3,707,665 A | 12/1972 | Gyugyi |
| 3,707,666 A | 12/1972 | Gyugyi |
| 3,707,667 A | 12/1972 | Gyugyi |
| 3,858,105 A | 12/1974 | Gyugyi |
| 4,172,234 A | 10/1979 | Gyugyi et al. |
| 4,210,860 A | 7/1980 | Rosa et al. |
| 4,307,331 A | 12/1981 | Gyugyi |
| 4,348,631 A | 9/1982 | Gyugyi et al. |
| 4,353,024 A | 10/1982 | Gyugyi |
| 4,394,614 A | 7/1983 | Brennen et al. |
| 4,437,052 A | 3/1984 | Gyugyi |
| 4,438,386 A | 3/1984 | Gyugyi |
| 4,439,823 A | 3/1984 | Gyugyi et al. |
| 4,488,216 A | 12/1984 | Gyugyi et al. |
| 4,538,220 A | 8/1985 | Gyugyi |
| 4,555,659 A | 11/1985 | Gyugyi |
| 4,560,917 A | 12/1985 | Gyugyi |
| 4,578,746 A | 3/1986 | Gyugyi et al. |
| 4,743,832 A | 5/1988 | Brennen et al. |
| 5,343,139 A | 8/1994 | Gyugyi et al. |
| 5,351,181 A | 9/1994 | Brennen et al. |
| 5,469,044 A | 11/1995 | Gyugyi et al. |
| 5,642,007 A | 6/1997 | Gyugyi et al. |
| 5,642,275 A | 6/1997 | Peng et al. |
| 5,698,969 A | 12/1997 | Gyugyi |
| 5,734,257 A | 3/1998 | Schauder et al. |
| 5,808,452 A | 9/1998 | Gyugyi et al. |
| 6,075,350 A | 6/2000 | Peng |
| RE37,126 E | 4/2001 | Peng et al. |
| 7,269,037 B2 | 9/2007 | Marquardt |
| 2005/0083716 A1 | 4/2005 | Marquardt |
| 2008/0272718 A1 | 11/2008 | Marquardt |
| 2010/0020577 A1 | 1/2010 | Dommaschk et al. |
| 2010/0067266 A1 | 3/2010 | Dommaschk et al. |
| 2010/0321038 A1 | 12/2010 | Dommaschk et al. |
| 2012/0127766 A1* | 5/2012 | Crookes et al. ............... 363/126 |
| 2012/0188803 A1* | 7/2012 | Trainer et al. .................. 363/37 |
| 2013/0128629 A1* | 5/2013 | Clare et al. ...................... 363/35 |
| 2014/0362618 A1* | 12/2014 | Hassan ........................... 363/35 |

FOREIGN PATENT DOCUMENTS

| | | |
|---|---|---|
| CA | 859864 A | 12/1970 |
| CA | 917249 A | 12/1972 |
| CA | 1159514 A1 | 12/1983 |
| CN | 1159255 A | 9/1997 |
| CN | 100541999 C | 9/2009 |
| DE | 10103031 A1 | 7/2002 |

OTHER PUBLICATIONS

Marquardt, Rainer et al., Modular Converter Concept for Network Interconnection Application at High Voltages, 2002.

Gyugyi, L. et al., The Unified Power Flow Controller: A New Approach to Power Transmission Control, IEEE Transactions on Power Delivery, vol. 10, No. 2, Apr. 1995.

Wan, C. et al., An Active and Reactive Power Regulating System Based on a Cascaded-converter, 2nd IEEE International Symposium on Power Electronics for Distrubuted Generation Systems, 2010.

Peng, Fang-zen, et al., Applications of Cascade Multilevel Inverters, Journal of Zhejiang University Science, vol. 4, No. 6, Nov.-Dec. 2003.

Rodriguez, Jose et al., Multilevel Inverters: A Survey of Topologies, Controls, and Applications, IEEE Transactions on Industrial Electronics, vol. 49, No. 4, Aug. 2002.

Tolbert, Leon M. et al., Multilevel Converters as a Utility Interface for Renewable Energy Systems, IEEE, 2000.

Wang, Jin et al., Unified Power Flow Controller Using the Cascade Multilevel Inverter, IEEE Transactions on Power Electronics, vol. 19, No. 4, Jul. 2004.

Peng, F.Z. et al., Cascade Multilevel Inverters for Utility Applications, IEEE, Nov. 1997.

International Serach Report and Written Opinion for PCT Application No. PCT/US2013/027271, dated Oct. 29, 2014.

* cited by examiner

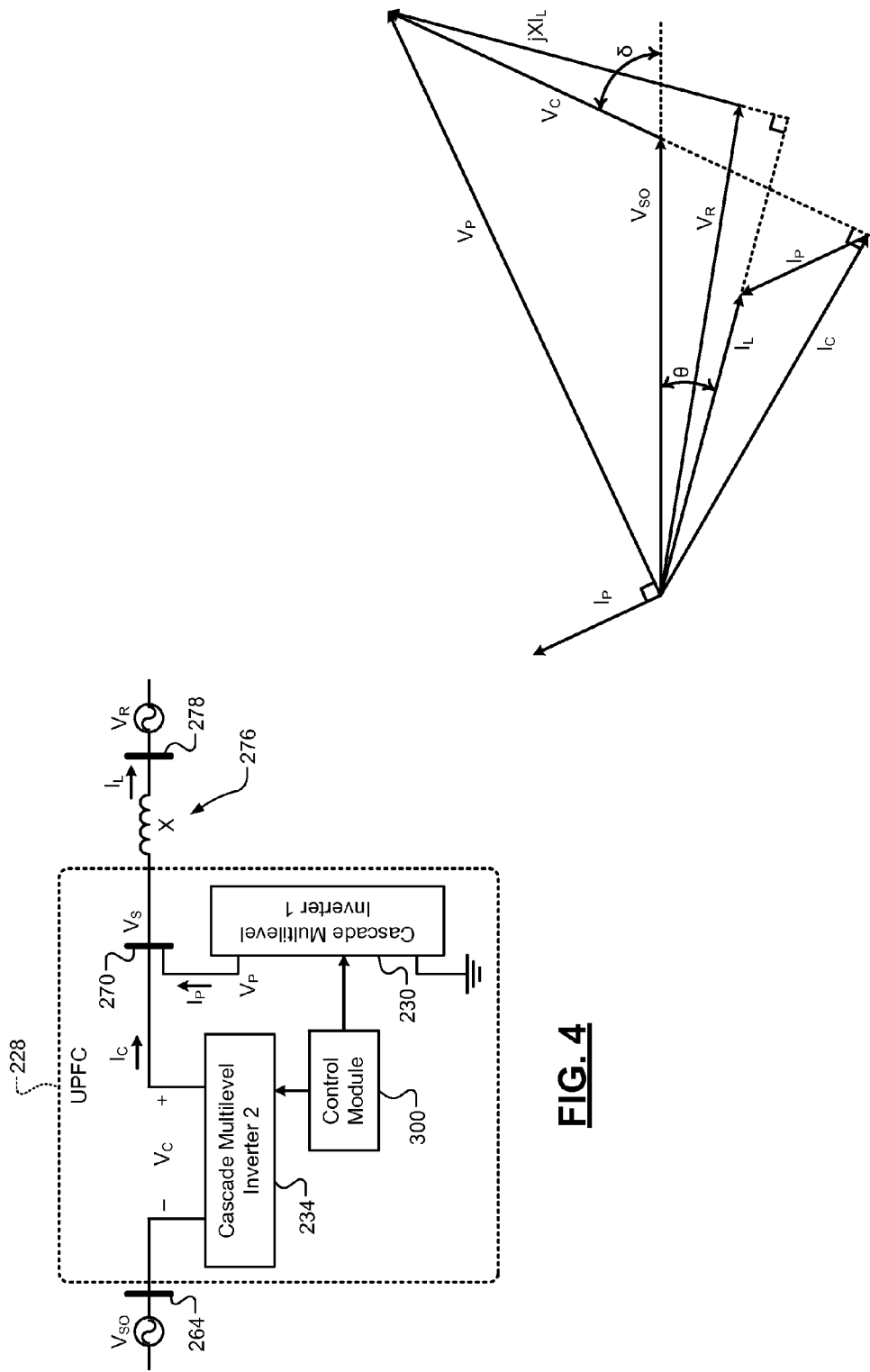

TRANSFORMER-LESS UNIFIED POWER FLOW CONTROLLER

CROSS-REFERENCE TO RELATED APPLICATIONS

This application is a 371 U.S. National Phase entry of PCT/US2013/027271, filed Feb. 22, 2013 and published in English as WO 2013/126660 A2 on Aug. 29, 2013, which claims the benefit of U.S. Provisional Application No. 61/602,915, filed Feb. 24, 2012. The entire disclosures of the above applications are incorporated herein by reference.

FIELD

This application relates to AC power transmission and more particularly to power control devices implemented using cascade multilevel inverters and without transformers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

High voltage electrical transmission and distribution may be performed with a variety of configurations, including a radial system and a mesh system. A meshed grid network may have various benefits over a radial system, including higher reliability, especially under contingency conditions. However, unless the meshed grid network is able to be controlled effectively, the network may be unable to handle congestion of key transmission lines when distributed, unscheduled, or intermittent alternative energy sources are connected to the grid.

For example only, wind and solar power may be unscheduled, intermittent, and geographically distributed. Not only does this lead to inefficient operation of energy markets, but the first transmission line in a mesh network to reach its capacity may limit the capacity of the entire system, even if the majority of the lines in the system are significantly below their limits.

Unified power flow controllers (UPFCs) may mitigate this problem by balancing the load of various lines, allowing the overall system to operate closer to its theoretical maximum capacity. UPFCs may be used to implement the functionality of flexible AC transmission system (FACTS) devices, such as a static var generator (SVG), a static synchronous compensator (STATCOM), or a static var compensator (SVC). In various implementations, UPFCs may also implement power line conditioning, series compensation, phase shifting, voltage balancing, etc.

However, traditional UPFCs are built using back-to-back inverters and require bulky and complicated zigzag transformers to achieve high voltage and power handling capabilities. The zigzag transformers are very expensive (for example, 30-40% of total system costs), lossy (for example, accounting for 50% of the total power losses), bulky (for example, 40% of system area), and more prone to failure. In addition, transformers used in these applications are slow in dynamic response, sometimes taking on the order of minutes to respond due to large time constants of magnetizing inductance over resistance. In addition, transformers may pose control challenges due to transformer saturation, DC offset, and voltage surge. For this reason, traditional UPFCs have not been widely used for power control, including in alternative energy applications.

To reduce the size of the required transformers, various techniques have been used, including cascade multilevel inverters (CMIs). For example only, see Peng et al., U.S. Pat. No. 5,642,275, issued Jun. 24, 1997, the entire disclosure of which is hereby incorporated by reference. Using CMIs to create a UPFC has traditionally still required isolation transformers, even if the zigzag transformers could be reduced or eliminated.

Referring now to FIG. 1A, an example cascade multilevel inverter (CMI) 100 is presented. The CMI 100 includes bridge modules 104-1, 104-2, 104-3, and 104-4 (collectively, bridge modules 104). The bridge modules 104 are connected in series such that a second terminal of the bridge module 104-1 is connected to a first terminal of the bridge module 104-2, a second terminal of the bridge module 104-2 is connected to a first terminal of the bridge module 104-3, and a second terminal of the bridge module 104-3 is connected to a first terminal of the bridge module 104-4. A first terminal of the bridge module 104-1 and a second terminal of the bridge module 104-4 serve as terminals of the CMI 100. Each of the bridge modules 104 has third and fourth terminals to connect to a corresponding capacitor. In various implementations, an inductor is connected in series with the bridge modules 104, which may reduce transient and/or circulating current.

The bridge modules 104 are therefore associated with capacitors 108-1, 108-2, 108-3, and 108-4, respectively. The first and second terminals of the bridge modules 104 may be referred to as AC (alternating current) terminals, while the third and fourth terminals of the bridge modules 104 may be referred to as DC (direct current) terminals.

Referring now to FIGS. 1B-1E, example implementations of bridge modules, such as the bridge modules 104 of FIG. 1A, are shown. In FIG. 1B, a bridge module 400 includes a first terminal connected to a node between a switch 404 and a switch 408. A second terminal of the bridge module 400 is connected to a node between a switch 412 and a switch 416. Opposite ends of the switches 404 and 412 are connected to a first terminal of a capacitor 420. Opposite terminals of the switches 408 and 416 are connected to a second terminal of the capacitor 420. The arrangement of the switches 404, 408, 412, and 416 may be referred to as a full bridge.

Referring now to FIG. 1C, an alternative implementation of the bridge module 440 is shown. A first terminal of the bridge module 440 is connected to a node in between a switch 444 and a first terminal of a capacitor 448. A second terminal of the bridge module 440 is connected to a node between the switch 444 and a switch 452. An opposite terminal of the switch 452 is connected to a second terminal of the capacitor 448. The arrangement of the switches in FIGS. 1C-1E may be described as half bridges generally and respectively as positive, negative, and neutral half bridges.

Referring now to FIG. 1D, another example half-bridge implementation of a bridge module 480 is shown. A first terminal of the bridge module 480 is connected to a node between a switch 484 and a switch 492. Opposite terminals of the switches 484 and 492 are connected to first and second terminals of a capacitor 496, respectively. A second terminal of the bridge module 480 is connected to a node between the switch 492 and the second terminal of the capacitor 496.

Referring now to FIG. 1E, another example half-bridge implementation of a bridge module 520 is shown. A first terminal of the bridge module 520 is connected to a node between a switch 524 and a switch 528. A second terminal of the bridge module 520 is connected to a second terminal of a capacitor 532 and a first terminal of a capacitor 536. An opposite terminal of the switch 524 is connected to a first terminal of the capacitor 532, while an opposite terminal of the switch 528 is connected to a second terminal of the capacitor 536.

Each of the bridge modules 400, 440, 480, and 520 can present a selectable voltage between its terminals. For example, the voltage between the terminals of the bridge module 400 can be $V_{DC}$, zero, or $-V_{DC}$, where $V_{DC}$ is the voltage across the capacitor 420. The voltage between the terminals of the bridge module 440 or the bridge module 480 can be either $V_{DC}$ or 0. The voltage between the terminals of the bridge module 520 can either be $V_{DC1}$ or $V_{DC2}$, where $V_{DC1}$ is the voltage across the capacitor 532 and $V_{DC2}$ is the voltage across the capacitor 536.

Referring now to FIG. 1F, an example implementation of a switch 560 is presented. The switch 560 may be used as one or more of the switches in any of FIGS. 1B-1E. The switch 560 has a first terminal and a second terminal and a semiconductor switching device 564 connected between the first and second terminals. A diode 568 is connected antiparallel to the semiconductor switching device 564. In various implementations, the semiconductor switching device 564 may include, for example only, a power MOSFET (metal-oxide-semiconductor field-effect transistor), an IGBT (insulated gate bipolar transistor), or a gate turn-off thyristor.

Referring now to FIG. 1G, another example implementation of a switch 580 is presented, which may be used as one or more of the switches in any of FIGS. 1B-1E. The switch 580 includes a semiconductor switching device 584 and a diode 588 connected antiparallel to the semiconductor switching device 584. The semiconductor switching device 584 may be implemented using, for example, an insulated gate bipolar transistor, a metal-oxide-semiconductor field-effect transistor (MOSFETs), and/or a gate turn-off thyristor.

Referring now to FIG. 2A, an example three-phase three-wire connection of CMIs in a delta configuration is presented. In this case, CMI 160, CMI 162, and CMI 164 are connected in a delta configuration in which a second terminal of the CMI 160 is connected to a first terminal of CMI 162, a second terminal of the CMI 162 is connected to a first terminal of the CMI 164, and a second terminal of the CMI 164 is connected to a first terminal of the CMI 160. The incoming three-phase voltages, $V_A$, $V_B$, and $V_C$, are connected to the first terminals of the respective CMIs 160, 162, and 164.

Referring now to FIG. 2B, an example three-phase three-wire connection of CMIs in a wye (or, star) configuration is presented. For simplicity, the same three CMIs 160, 162, and 164 are shown, and still receive voltages $V_A$, $V_B$, and $V_C$ at the respective first terminals. In this case, however, the second terminals of the CMIs 160, 162, and 164 are connected together at a common node.

SUMMARY

A power control device includes a first terminal, a second terminal connected to a transmission line, a first cascade multilevel inverter (CMI) and a second CMI. The first CMI is connected to the second terminal. The second CMI connected in series between the first terminal and the second terminal.

In other features, the power control device further includes a control module that controls the first CMI to regulate average real power into and out from the second CMI. The control module controls the first CMI to apply a current to the second terminal to regulate average real power into and out from the second CMI. The control module (i) calculates a compensation current to regulate the average real power into and out from both the second CMI and the first CMI and (ii) controls the first CMI to apply the compensation current.

In further features, the control module controls the second CMI to provide a commanded real power and a commanded reactive power from the first terminal to the second terminal. The control module controls the second CMI to provide a commanded real power and a commanded reactive power from the second terminal to the first terminal. The power control device further includes a control module that controls the first CMI to cause a voltage phasor of the first CMI and a current phasor of the first CMI to approach a perpendicular angle to each other. The control module controls the first CMI to cause (i) the voltage phasor of the first CMI and the current phasor of the first CMI to approach a perpendicular angle to each other and (ii) a voltage phasor of the second CMI and a current phasor of the second CMI to approach a perpendicular angle to each other.

In other features, the power control device further includes a control module that (i) determines a reference voltage based on a commanded real power and a commanded reactive power and (ii) controls the second CMI to create the reference voltage across the second CMI. The control module controls the second CMI in synchronization with an electrical grid to which the power control device is connected. The control module (i) determines a desired compensation current and (ii) controls the first CMI to generate the desired compensation current.

In further features, the control module measures a current through the first CMI and controls the first CMI to reduce a difference between the measured current through the first CMI and the desired compensation current. The control module determines the desired compensation current based on a current through the transmission line and a current through the second CMI. The control module calculates the current through the second CMI based on the reference voltage, a voltage at the first terminal, and the current through the transmission line.

In other features, the first CMI includes a plurality of bridge modules connected in series, wherein each of the plurality of bridge modules (i) has a first terminal and a second terminal and (ii) is controllable to produce one of a plurality of voltages between the first and second terminals of the bridge module. Each of the plurality of bridge modules is controllable to produce one of two or three voltages between the first and second terminals of the bridge module.

In further features, the second CMI includes a plurality of bridge modules connected in series, wherein each of the plurality of bridge modules has a first terminal and a second terminal and is controllable to produce one of a plurality of voltages between the first and second terminals of the bridge module. Each of the plurality of bridge modules is controllable to produce one of two or three voltages between the first and second terminals of the bridge module. The power control device further includes a control module that controls the first CMI to generate a desired reactive power into the second terminal. In other features, the first CMI is controlled to source zero current to the second terminal and sink zero current from the second terminal.

A method of operating a power control device includes controlling a first cascade multilevel inverter (CMI) and controlling a second CMI. The first CMI is controlled to (i) regulate average real power dissipated into and out from the first CMI and (ii) regulate average real power into and out from the second CMI. The second CMI is controlled to provide a commanded real power and a commanded reactive power from a first terminal of the power control device to a second terminal of the power control device. The second CMI is connected in series between the first terminal and the second terminal. The first CMI is connected to the second terminal.

In other features, the method includes calculating a compensation current and controlling the first CMI. The compensation current is calculated to regulate the average real power into and out from both the second CMI and the first CMI. The first CMI is controlled to apply the compensation current to the second terminal. The method includes selectively controlling the second CMI to provide the commanded real power and the commanded reactive power from the second terminal to the first terminal.

In further features, the method includes controlling the first CMI to cause a voltage phasor of the first CMI and a current phasor of the first CMI to approach a perpendicular angle to each other. The method includes controlling the first CMI to cause (i) the voltage phasor of the first CMI and the current phasor of the first CMI to approach a perpendicular angle to each other and (ii) a voltage phasor of the second CMI and a current phasor of the second CMI to approach a perpendicular angle to each other.

In other features, the method includes determining a reference voltage based on the commanded real power and the commanded reactive power, and controlling the second CMI to create the reference voltage across the second CMI. The method includes controlling the second CMI in synchronization with an electrical grid to which the power control device is connected. The method includes determining a desired compensation current, and controlling the first CMI to generate the desired compensation current. The method includes measuring a current through the first CMI, and controlling the first CMI to reduce a difference between the measured current through the first CMI and the desired compensation current.

In further features, the method includes determining the desired compensation current based on (i) a current through a transmission line connected to the second terminal and (ii) a current through the second CMI. The method includes calculating the current through the second CMI based on the reference voltage, a voltage at the first terminal, and the current through the transmission line. The first CMI includes a plurality of bridge modules connected in series, wherein each of the plurality of bridge modules has a first terminal and a second terminal and is controllable to produce one of a plurality of voltages between the first and second terminals of the bridge module. The method includes controlling the first CMI to select one of the plurality of voltages for each of the plurality of bridge modules.

In other features, the second CMI includes a plurality of bridge modules connected in series, wherein each of the plurality of bridge modules has a first terminal and a second terminal and is controllable to produce one of a plurality of voltages between the first and second terminals of the bridge module. The method includes controlling the second CMI to select one of the plurality of voltages for each of the plurality of bridge modules. The method includes controlling the first CMI to generate a desired reactive power into the second terminal.

A power control device includes a first cascade multilevel inverter (CMI), a second CMI, a third CMI, a fourth CMI, a fifth CMI, and a sixth CMI. The first CMI is connected in series between a first terminal of a first 3-phase line and a first terminal of a second 3-phase line. The second CMI is connected in series between a second terminal of the first 3-phase line and a second terminal of the second 3-phase line. The third CMI is connected in series between a third terminal of the first 3-phase line and a third terminal of the second 3-phase line. The fourth CMI has a first terminal connected to the first terminal of the second 3-phase line. The fifth CMI has a first terminal connected to the second terminal of the second 3-phase line. The sixth CMI has a first terminal connected to the third terminal of the second 3-phase line.

In other features, the fourth CMI has a second terminal that is connected to a second terminal of the fifth CMI and a second terminal of the sixth CMI. The second terminals of the fourth, fifth, and sixth CMIs are connected to a reference potential. The fourth CMI has a second terminal that is connected to the first terminal of the fifth CMI. The fifth CMI has a second terminal that is connected to the first terminal of the sixth CMI. The sixth CMI has a second terminal that is connected to the first terminal of the fourth CMI.

A power converter includes a positive DC terminal, a negative DC terminal, and a plurality of converter legs. The plurality of converter legs is connected between the positive DC terminal and the negative DC terminal. Each of the plurality of converter legs includes a series connection of a first cascade multilevel inverter (CMI), a first inductor, a second inductor, and a second CMI. Each of the plurality of converter legs is associated with a respective AC terminal that is connected to a node between the first inductor and the second inductor.

In other features, the power converter selectively converts AC power from the AC terminals to DC power across the positive and negative DC terminals. The power converter selectively converts DC power across the positive and negative DC terminals to AC power at the AC terminals. The plurality of converter legs is two converter legs. A first one of the two converter legs is connected to a first terminal of a single-phase AC line. A second one of the two converter legs is connected to a second terminal of the single-phase AC line.

In further features, the plurality of converter legs is three converter legs. A first one of the three converter legs is connected to a first terminal of a three-phase AC line. A second one of the three converter legs is connected to a second terminal of the three-phase AC line. A third one of the three converter legs is connected to a third terminal of the three-phase AC line. A power conversion system includes the power converter, and a second power converter.

In other features, the second power converter includes three converter legs connected between the positive DC terminal and the negative DC terminal. Each of the three converter legs includes a series connection of a first cascade multilevel inverter (CMI), a first inductor, a second inductor, and a second CMI. Each of the three converter legs is associated with a respective AC terminal that is connected to a node between the first inductor and the second inductor, the AC terminal being one phase of a second three-phase AC line. The power conversion system converts AC power at a first frequency to AC power at a second frequency. The power conversion system converts AC power at a first amplitude to AC power at a second amplitude. The power conversion system converts AC power having a first phase shift to AC power having a second phase shift.

A power control device includes a first terminal, a second terminal connected to a transmission line, and a cascade multilevel inverter (CMI). The CMI is connected between the first terminal and the second terminal. The CMI includes a plurality of bridge modules connected in series. Each of the plurality of bridge modules (i) has a first terminal and a second terminal and (ii) is controllable to produce one of a plurality of voltages between the first and second terminals of the bridge module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a functional block diagram of a unified power flow controller according to the principles of the present disclosure;

FIG. 5 is a phasor diagram corresponding to the unified power flow controller of FIG. 4A;

DETAILED DESCRIPTION

A unified power flow controller (UPFC) according to the principles of the present disclosure includes cascade multilevel inverters (CMIs) configured such that transformers may be eliminated entirely. UPFCs may be referred to more broadly as power control devices. By reducing or eliminating transformers, UPFCs may be cheaper, smaller, faster to respond (for example only, dynamic performance response of 1-2 milliseconds may be achieved), higher efficiency, lighter weight, and more reliable. This may allow UPFCs to be more widely used in new and existing grid installations. For example, a UPFC according to the principles of the present disclosure may be well suited for alternative energy, such as wind and solar, which may require properties such as high dynamic performance, light weight, small size, and low cost.

UPFCs may be used as energy routers and may be easily integrated over existing transmission lines to maximize energy transmission. As an example, a UPFC could be used to provide a certain amount of power, such as 100 MW, from a bus onto a specified transmission line. Use of UPFCs may enhance grid stability and allow more rapid and more reliable integration, development, and deployment of renewable power generation. For example only, UPFCs can be used to regulate and control power flow over AC transmission lines. In a mesh AC network, UPFCs can be used to prevent loops of power, which decrease efficiency and can result in detrimental feedback loops. UPFCs may be designed to have a minimal effect on power factor.

Figure 1B:
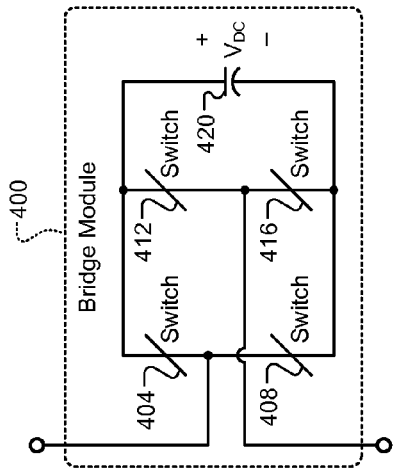
FIGS. 1B-1E are schematic diagrams of example bridges used in the cascade multilevel inverter of FIG. 1A.
Figure 1C:
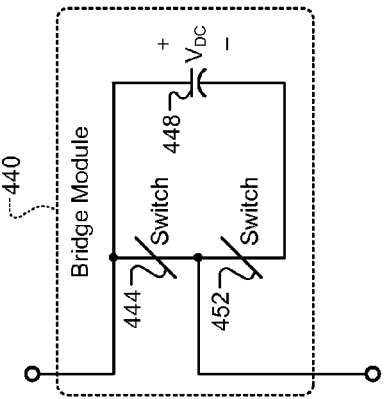
Figure 1A:
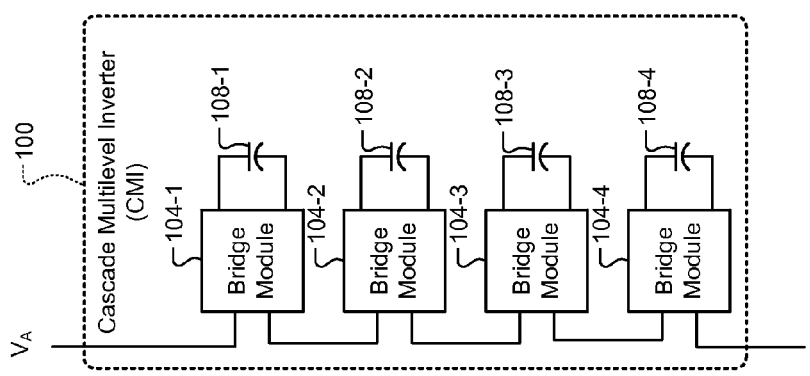
FIG. 1A is a schematic diagram of a cascade multilevel inverter according to the prior art.
Figure 1E:
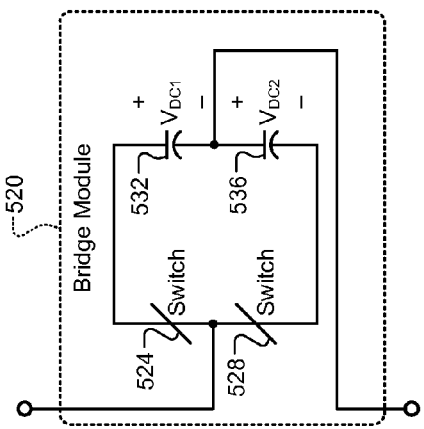
Figure 1G:
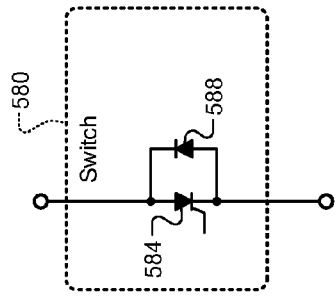
FIGS. 1F-1G are schematic diagrams of example switches used in the bridges of FIGS. 1B-1E.
Figure 1D:
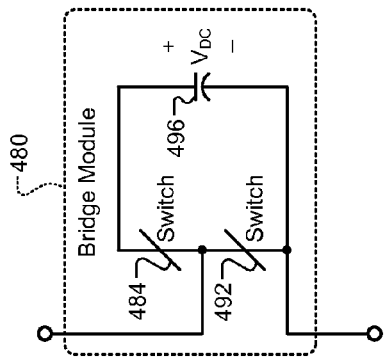
Figure 1F:
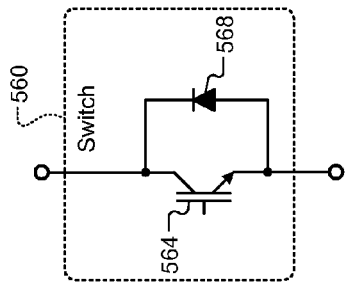
Figure 2A:
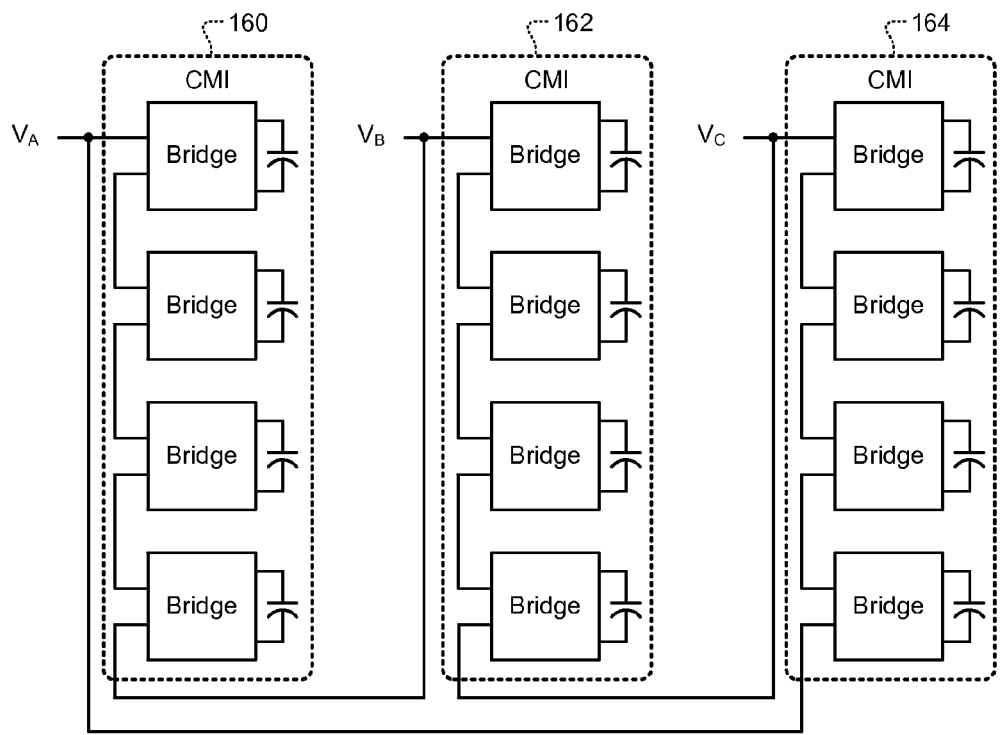
FIGS. 2A-2B are schematic diagrams of three-phase connection of cascade multilevel inverters according to the prior art.
Figure 2B:
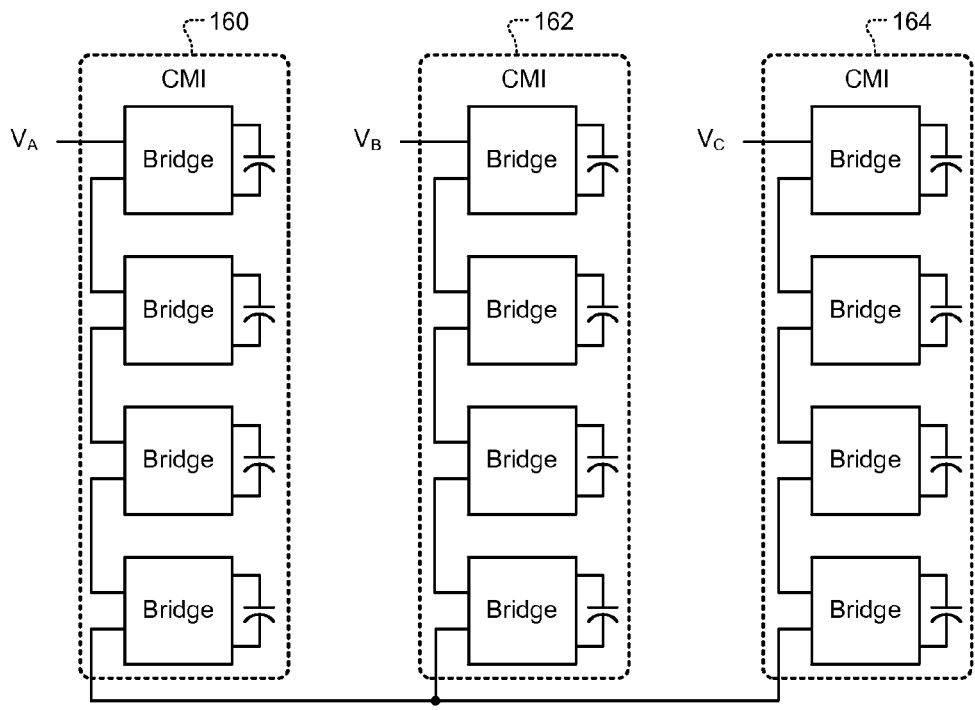
Figure 3A:
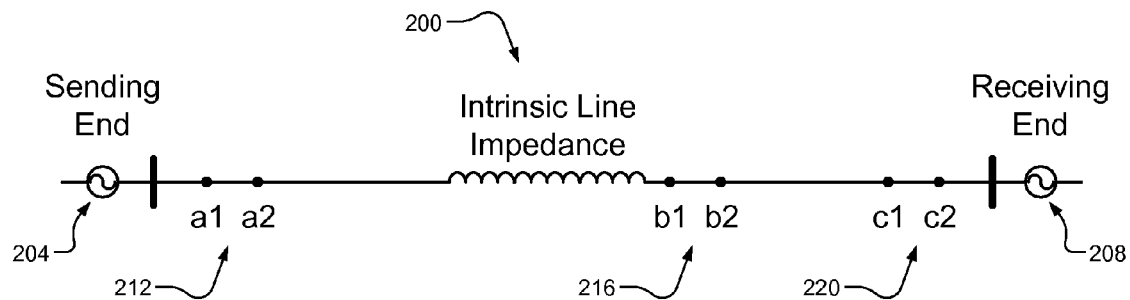
FIG. 3A is a single-line diagram of a transmission line according to the principles of the present disclosure.
Figure 6:
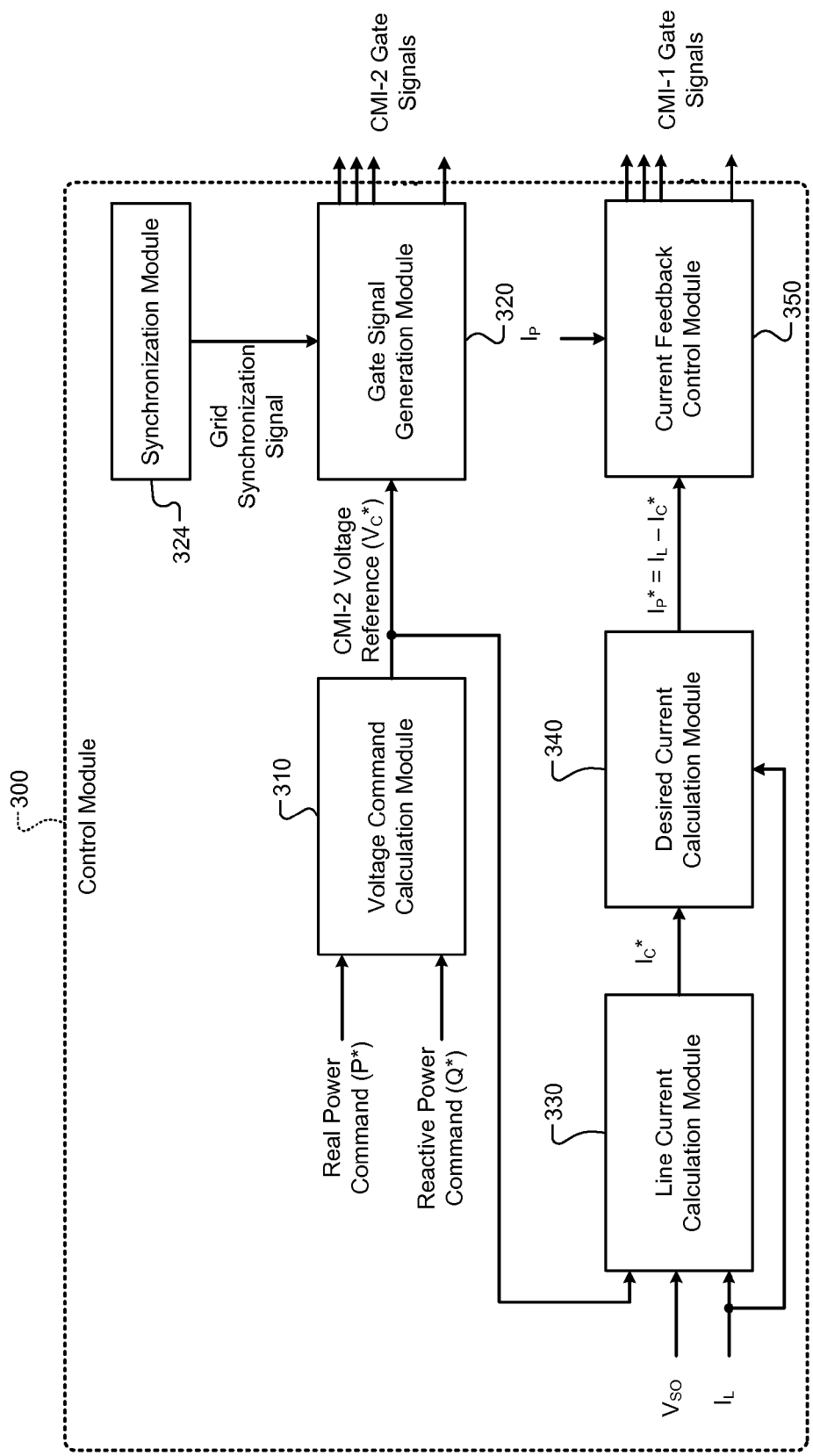
FIG. 6 is a functional block diagram of an example control module for the unified power flow controller of FIG. 4A.

In FIG. 3A, examples of UPFC placement along a transmission line are presented. In FIGS. 3B-3H, example implementations of UPFCs according to the principles of the present disclosure are presented. In FIG. 4, an alternative representation of an example UPFC is shown. In FIG. 5, a phasor diagram depicts the interactions of voltages and currents related to the UPFC and provides insight into control equations for the UPFC. In FIG. 6, example control of the CMIs in a UPFC is presented.

Figure 7A:
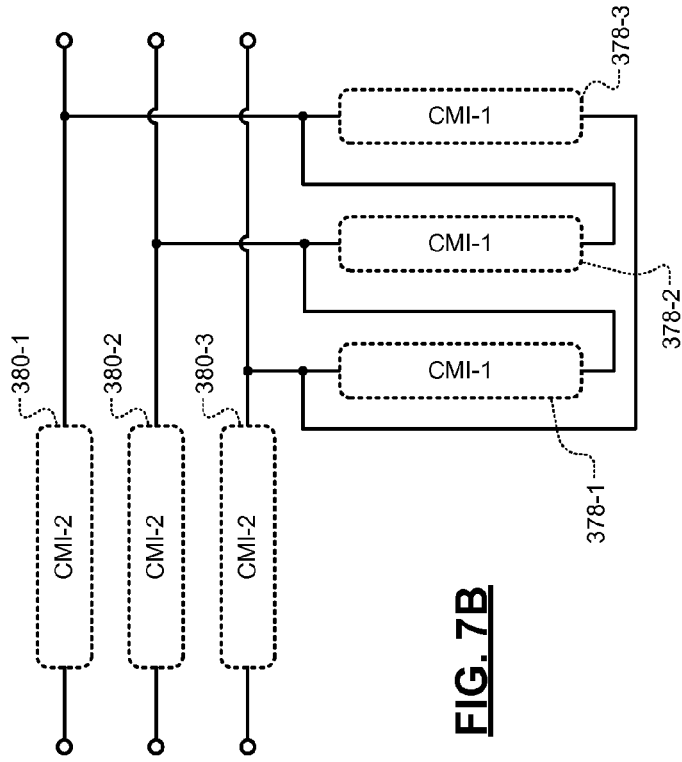
FIGS. 7A-7C are schematic diagrams of example three-phase connection of cascade multilevel inverters based on the single-line connection of FIG. 4A.
Figure 7B:
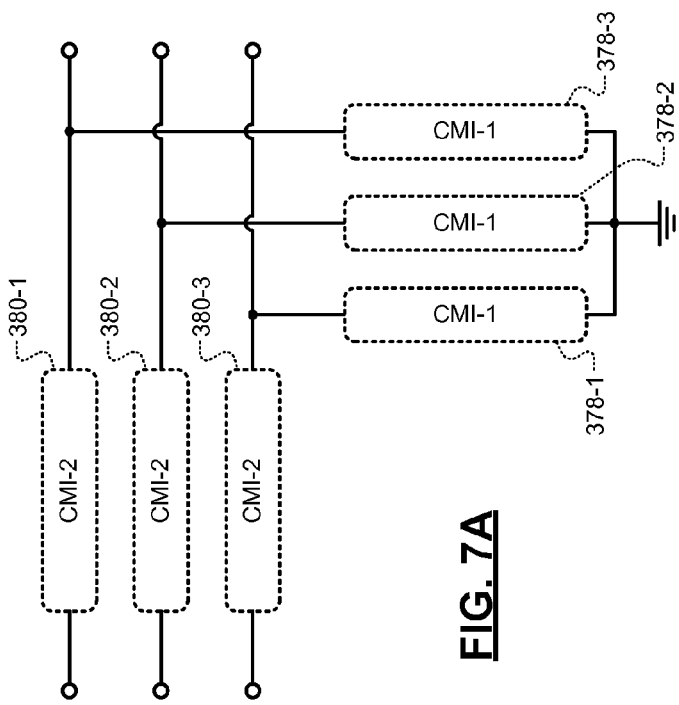
Figure 7C:
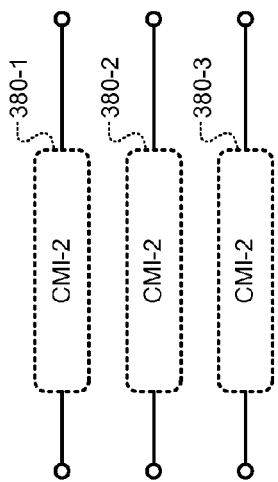
Figure 8:
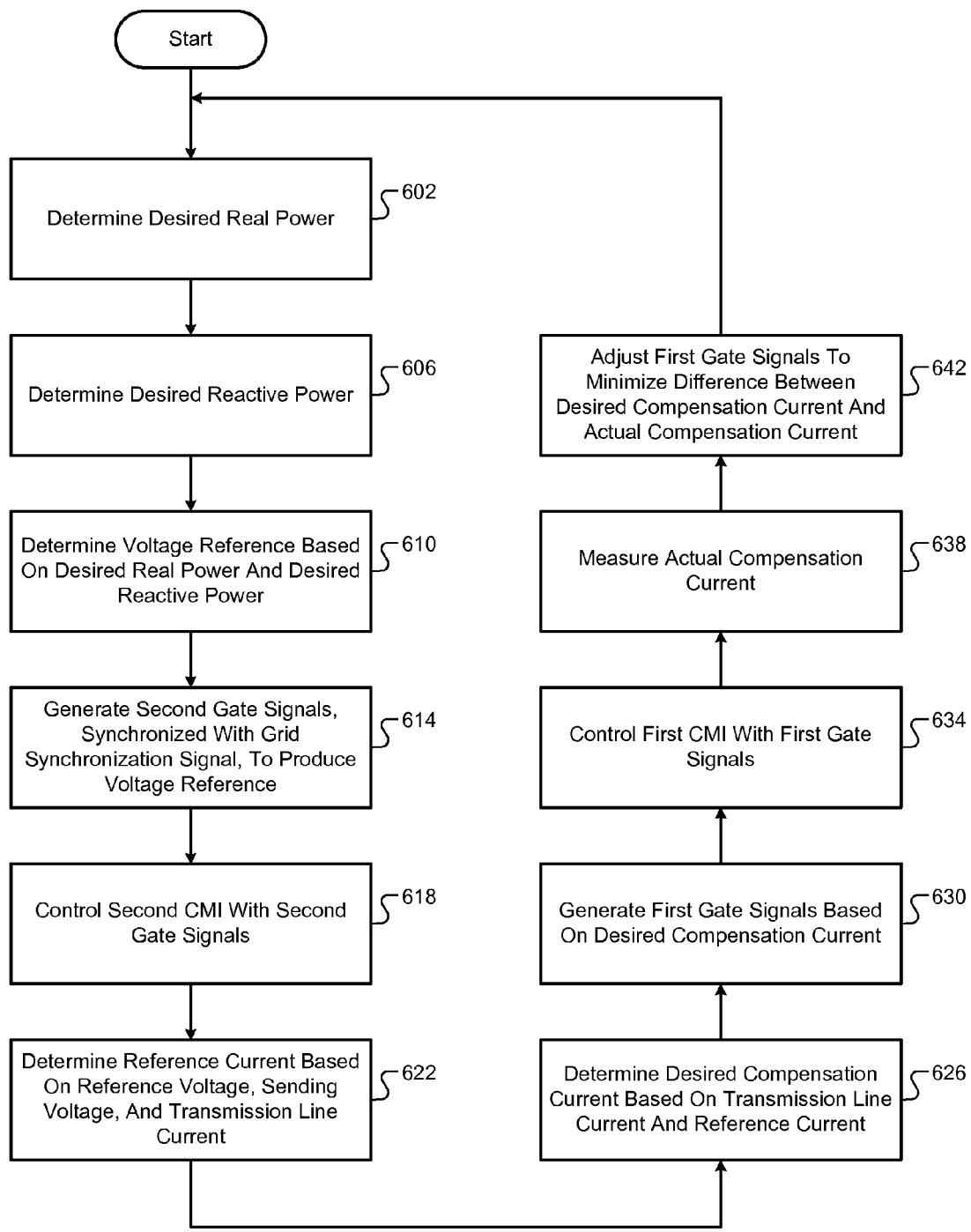
FIG. 8 is a flowchart for controlling a unified power flow controller according to the principles of the present disclosure.
Figure 9A:
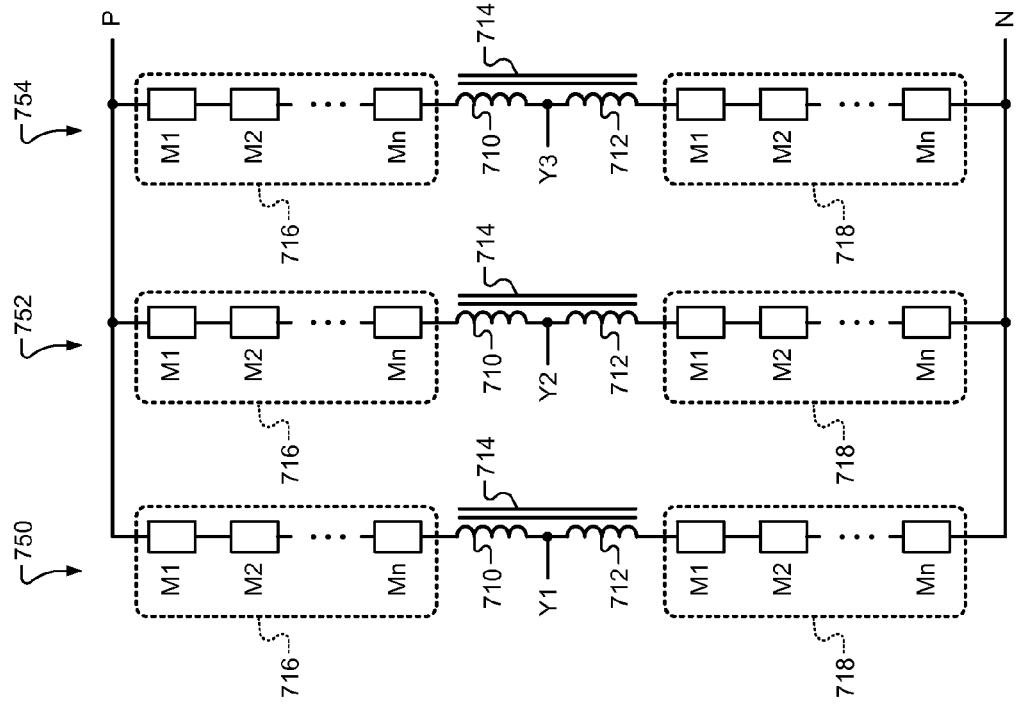
FIGS. 9A-9B are functional block diagrams of example AC/DC converters using cascade multilevel inverters according to the principles of the present disclosure.
Figure 9B:
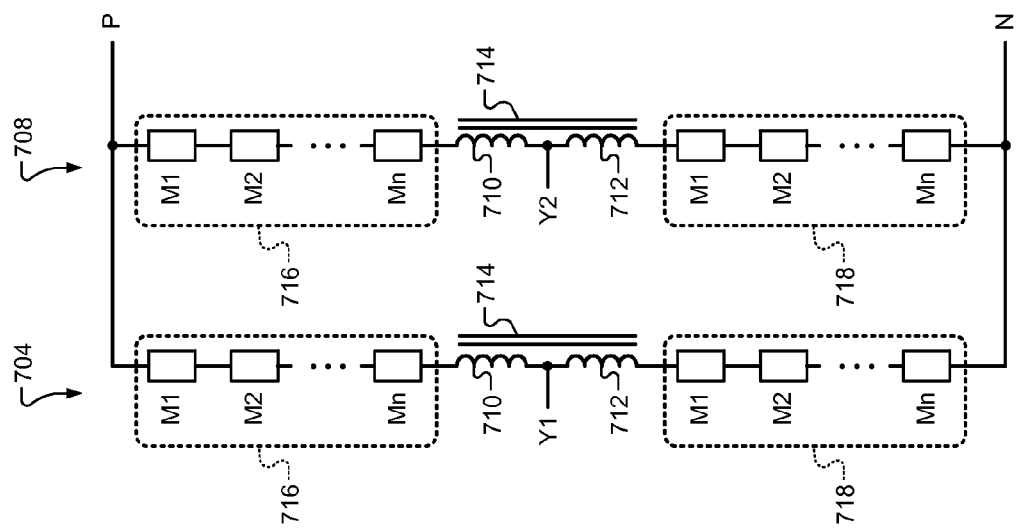
Figure 9C:
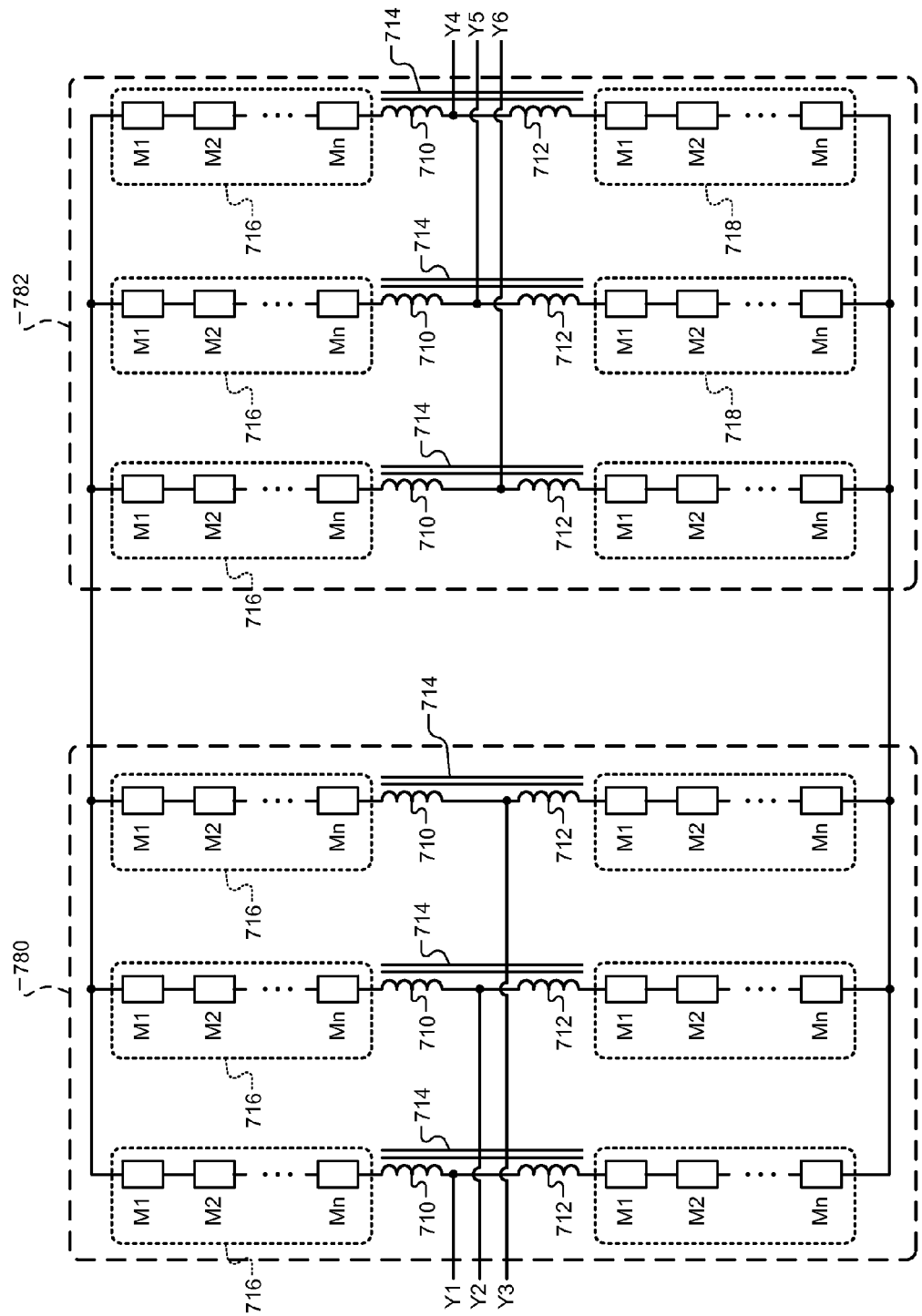
FIG. 9C is a functional block diagram of an example AC-DC-AC converter using cascade multilevel inverters according to the principles of the present disclosure.

FIGS. 7A-7C show three-line equivalents of UPFCs based on the one-line diagram of FIG. 4A. FIG. 8 is a flowchart depicting example control algorithms related to FIG. 5. FIGS. 9A and 9B depict example power converters using CMIs. The power converters may operate as AC to DC converters or as DC to AC converters. FIG. 9C is an example AC to DC to AC converter created using CMIs. The converters shown in FIGS. 9A-9C may mitigate harmonic issues present in traditional two-level converters. For example only, the converters may be used for high-voltage DC power transmission, medium and high voltage motor drives, and high voltage power supplies. The converters may also save space, reduce equipment weight, reduce costs, increase reliability and efficiency, and improve controllability and fault detection in comparison with traditional converters.

Returning to FIG. 3A, a transmission line 200 is connected between a sending end 204 and a receiving end 208. The transmission line 200 has an intrinsic impedance, which is represented graphically as an inductor. Along the transmission line 200 are pairs of points a1/a2 212, b1/b2 216, and c1/c2 220. UPFCs may be connected between terminals a1 and a2 212, between terminals b1 and b2 216, and/or between terminals c1 and c2 220.

Figure 3B:
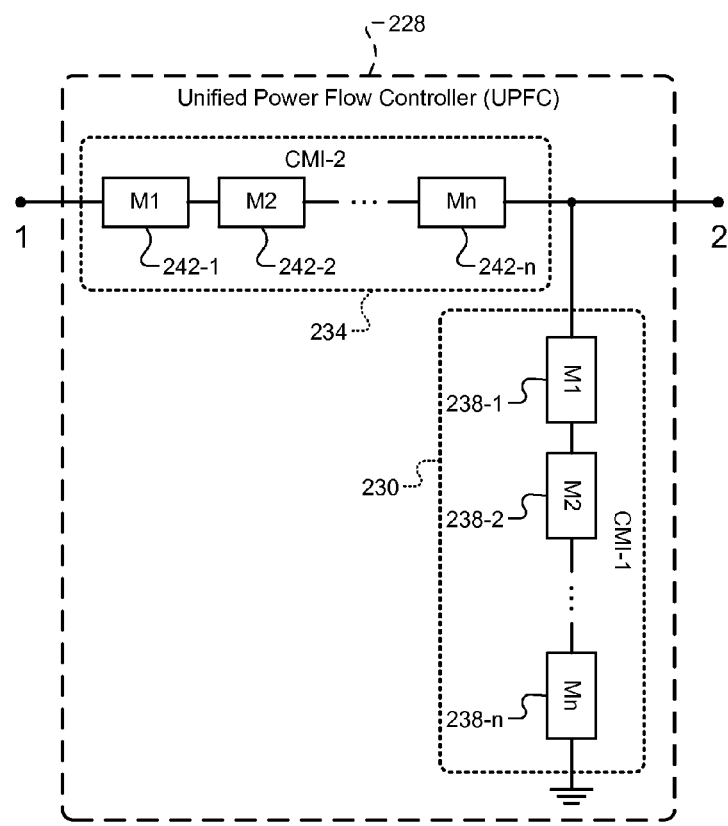
FIG. 3B is a schematic single-line diagram of an example unified power flow controller according to the principles of the present disclosure.

Referring now to FIG. 3B, an example implementation of a UPFC 228 is shown. First and second terminals of the UPFC 228 are labeled 1 and 2, respectively. These numbers correspond to the numbers in FIG. 3A. For example, the UPFC 228 of FIG. 3B may be connected between points a1 and a2 212 of FIG. 3A, where a1 corresponds to terminal 1 of FIG. 3B and a2 corresponds to terminal 2 of FIG. 3B. In various implementations, the UPFC 228 may be reversible, such that a1 will correspond to terminal 2 of FIG. 3B, while a2 corresponds to terminal 1 of FIG. 3B. The UPFC 228 of FIG. 3B may be bidirectional such that either configuration can be used. In addition, the UPFC 228 may be symmetrical in that there is no advantage to arranging the UPFC 228 in one configuration versus the other.

The UPFC 228 is formed by a first CMI 230 connected between terminal 2 and a reference potential, such as ground, and a second CMI 234 connected in series between terminal 1 and terminal 2. Each of the CMIs 230 and 234 can be formed using a series of bridge modules. For example only, the first CMI 230 can be formed from a series chain of M bridge modules M1 238-1, M2 238-2, . . . Mn 238-$n$ (collectively, bridge modules 238). Similarly, the second CMI 234 may be formed from M bridge modules M1 242-1, M2 242-2, . . . Mn 242-$n$ (collectively, bridge modules 242).

The bridge modules 242 used in the second CMI 234 may be different than some or all of the bridge modules 238 used in the first CMI 230. In addition, the number of bridge modules 242 in the second CMI 234 may be different than the number of bridge modules 238 in the first CMI 230. The bridge modules 238 and 242 may be implemented as shown in FIGS. 1B-1E. The bridge modules for a single CMI may all be of one type or may be of different types.

Figure 3C:
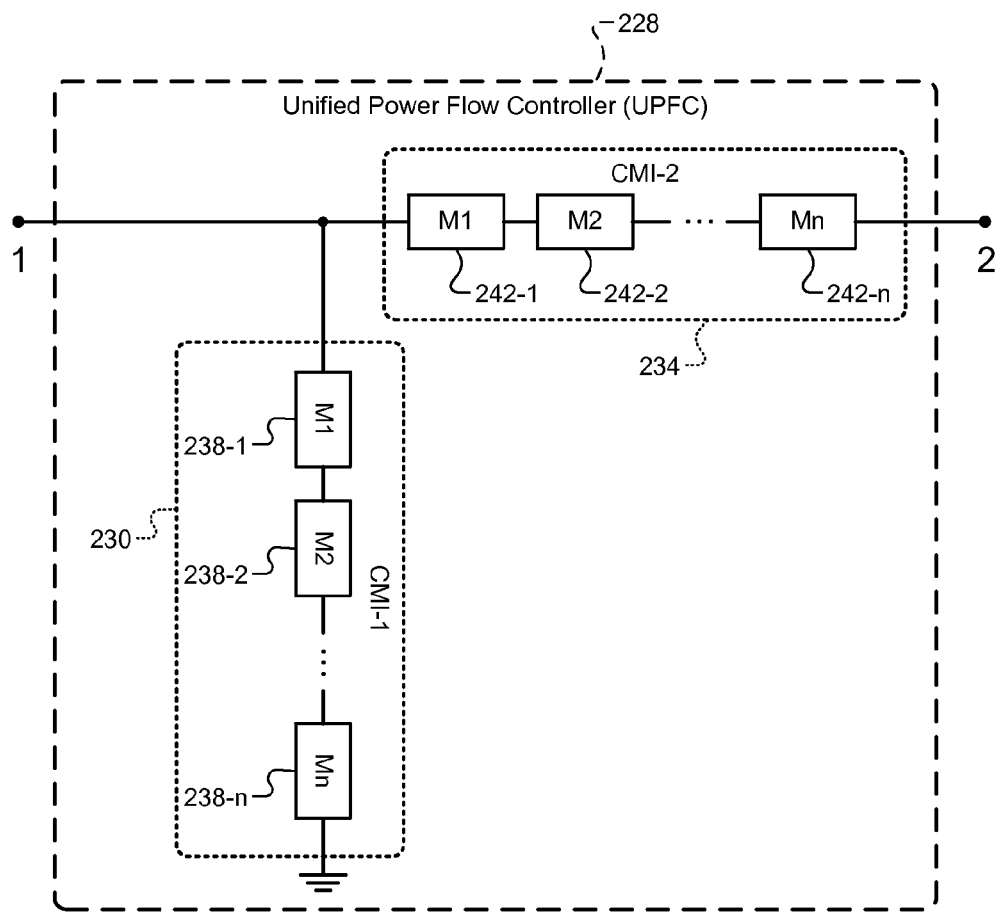
FIG. 3C is a schematic single-line diagram of another example unified power flow controller according to the principles of the present disclosure.

Referring now to FIG. 3C, an alternative implementation of the UPFC 228 is shown. In FIG. 3C, the first CMI 230 is connected between terminal 1 and the reference potential, instead of between terminal 2 and the reference potential as shown in FIG. 3B. The bridge modules 238 and 242 in the first CMI 230 and the second CMI 234, respectively, may be the same as or different than the bridge modules 238 and 242 of FIG. 3B.

Figure 3D:
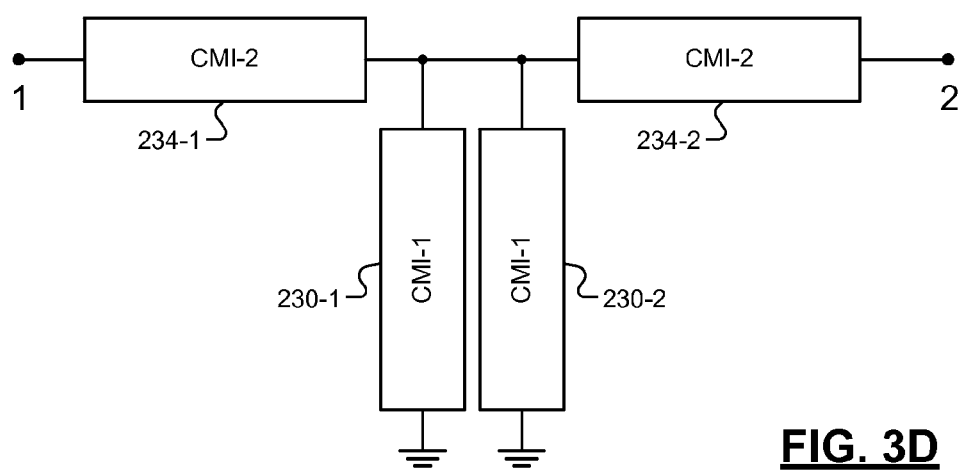
FIGS. 3D-3I are schematic single-line diagrams of additional example configurations of unified power flow controllers according to the principles of the present disclosure.
Figure 3E:
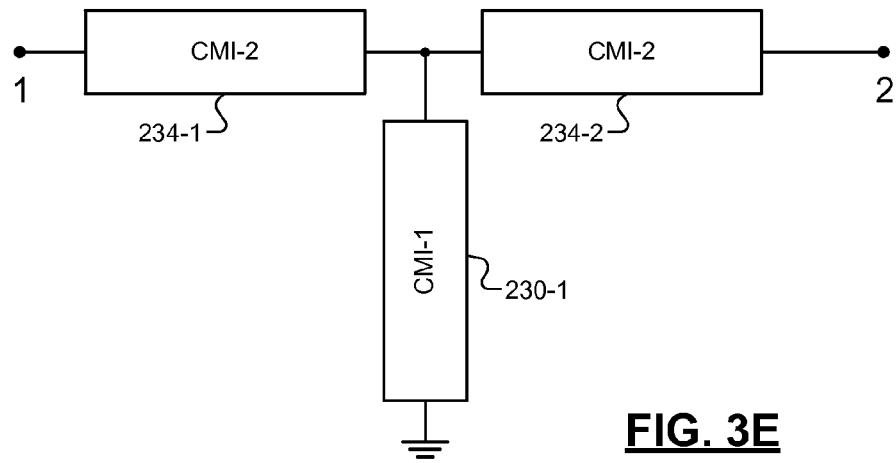

In FIG. 3D, another example implementation of a UPFC is shown. Two second CMIs 234-1 and 234-2 are connected in series between terminal 1 and terminal 2. Two first CMIs 230-1 and 230-2 are connected in parallel between a reference potential and the node between the second CMIs 234-1 and 234-2. In FIG. 3E, the first CMI 230-2 of FIG. 3D is removed. Other aspects of the UPFC from FIG. 3D may be shared with the UPFC of FIG. 3E.

Figure 3F:
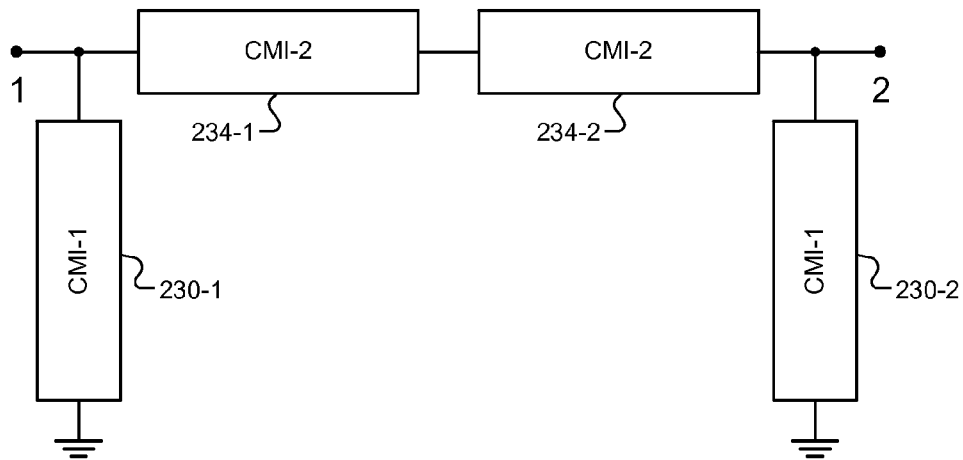
Figure 3G:
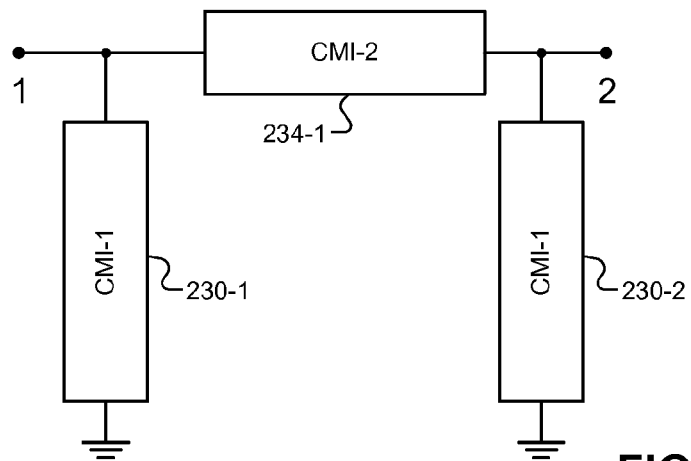

In FIG. 3F, the second CMIs 234-1 and 234-2 are connected in series between terminal 1 and terminal 2. The first CMI 230-1 is connected between terminal 1 and the reference potential, while the first CMI 230-2 is connected between terminal 2 and the reference potential. In FIG. 3G, the second CMI 234-2 of FIG. 3F is omitted. Other aspects of the UPFC of FIG. 3G may be similar to the UPFC of FIG. 3F.

Figure 3H:
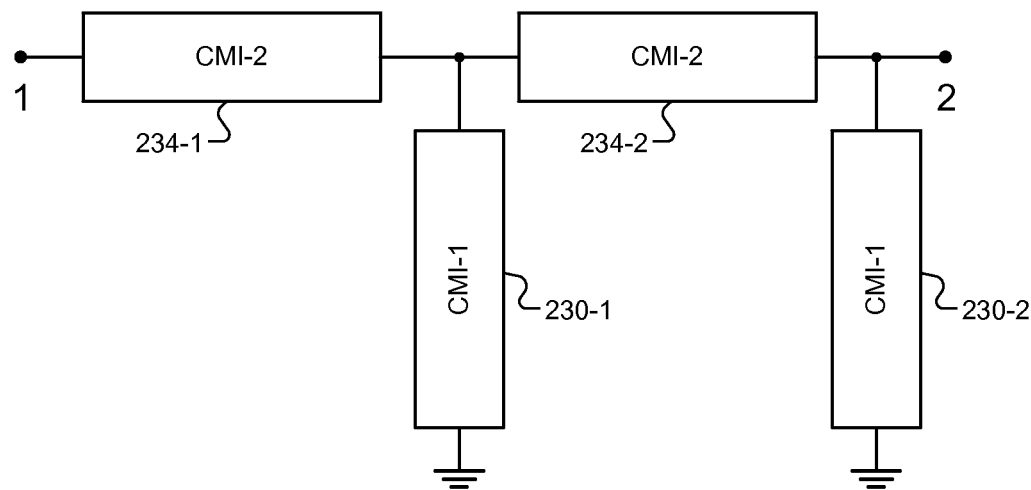
Figure 3I:
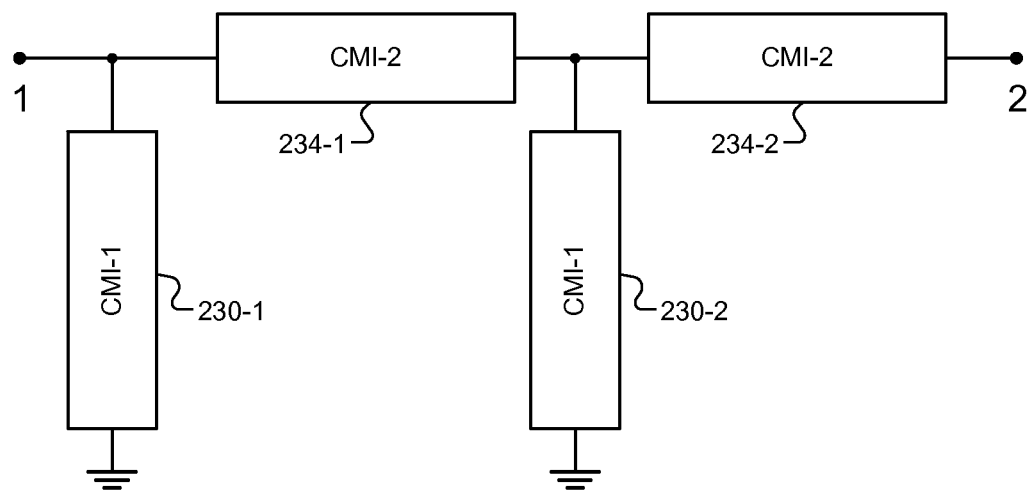

In FIG. 3H, a cascade arrangement for a UPFC is shown. The second CMIs 234-1 and 234-2 are connected in series between terminal 1 and terminal 2. The first CMI 230-1 is connected between the reference potential and the node between the second CMIs 234-1 and 234-2. The first CMI 230-2 is connected between terminal 2 and the reference potential. In FIG. 3H, two pairs of CMIs are shown but three or more pairs can be similarly arranged in a cascade fashion according to the principles of the present disclosure. In FIG. 3I, an example UPFC reversed with respect to FIG. 3H is shown. The second CMIs 234-1 and 234-2 are connected in series between terminal 1 and terminal 2. The first CMI 230-1 is connected between the reference potential and terminal 1. The first CMI 230-2 is connected between the reference potential and the node between the second CMIs 234-1 and 234-2. Again, more than two pairs of CMIs may be arranged in this cascade fashion.

Referring now to FIG. 4, the UPFC 228 of FIG. 3B is redrawn. The UPFC 228 includes the first CMI 230 and the second CMI 234. A first terminal of the second CMI 234 is connected to a sending end power source, having a voltage $V_{SO}$, via a bus 264. A second terminal of the second CMI 234 is connected via a bus 270 to a first terminal of the first CMI 230. A second terminal of the first CMI 230 may be connected to a reference potential such as ground or neutral.

A voltage between the second terminal of the second CMI 234 and the first terminal of the second CMI 234 is labeled $V_C$. A voltage at the second terminal of the first CMI 230 is labeled as $V_P$, and a voltage at the bus 270 is $V_S$, which may be the same as $V_P$. Current flowing from the second CMI 234 to the bus 270 is labeled $I_C$, while current flowing from the first CMI 230 to the bus 270 is labeled $I_P$. A transmission line 276 is depicted as an inductor and has an effective inductance value represented by X. The transmission line 276 is connected to a receiving end, having a voltage $V_R$, via a bus 278. The current flowing from the transmission line 276 to the bus 278 is labeled $I_L$. A control module 300 controls the first CMI 230 and the second CMI 234.

Referring now to FIG. 5, a phasor diagram of voltages and currents from FIG. 4 is shown. Because currents $I_C$, $I_P$, and $I_L$ all connect at the bus 270, the sum of currents $I_C$ and $I_P$ flowing into the bus 270 is equal to the current $I_L$ flowing out of the bus 270. The difference between voltages $V_S$ and $V_{SO}$ is voltage $V_C$. The difference between voltages $V_S$ and $V_R$ is $jXI_L$, as a result of modeling the transmission line 276 as an inductor, which has a voltage proportional to the current $I_L$ and inductance X. In addition, modeling the transmission line 276 as a pure inductance causes the current $I_L$ to be perpendicular to the voltage $jXI_L$.

When the voltage $V_C$ is perpendicular to the current $I_C$, no average real power flows into, or out from, the second CMI 234. Similarly, when the voltage $V_P$ is perpendicular to the current $I_P$, no average real power flows into, or out from, the first CMI 230. The first CMI 230 is controlled to generate a current $I_P$ that satisfies these two conditions, ignoring power losses within each of the CMIs 230 and 234. In practice, a small average real power may flow into each of the CMIs 230 and 234 to compensate for power losses in order to maintain the DC capacitor voltage of each bridge module to a desired voltage level. Therefore, the first CMI 230 is controlled to generate a current $I_P$ to regulate average real power into and out from each of the CMIs 230 and 234. For example only, regulating may include reducing average real power dissipated in each of the CMIs 230 and 234 to a lowest possible level by making the voltage and current phasors for the respective CMIs 230 and 234 as close to perpendicular as possible. In addition, the first CMI 230 can be used to generate reactive power as a static synchronous compensator (STATCOM).

Referring now to FIG. 6, an example block diagram of the control module 300 for the first and second CMIs 230 and 234 are shown. A voltage command calculation module 310 receives a real power command P and reactive power command Q. The voltage command calculation module 310 determines a voltage reference $V_C$ for the second CMI 234 based on the real power command and the reactive power command.

A gate signal generation module 320 receives a grid synchronization signal from a synchronization module 324. The grid synchronization signal is synchronized to periodic AC power of the electrical grid to which the UPFC 228 is attached. The gate signal generation module 320 generates gate signals for the second CMI 234, which are synchronized to the grid synchronization signal, based on the voltage reference $V_C$. The gate signals are applied to switches within the second CMI 234. Although referred to as gate signals, these control signals can be applied to control terminals, such as base terminals, of other types of switches.

A line current calculation module 330 calculates a current $I_C$ flowing out of the second CMI 234 based on $V_C$, $V_{SO}$, and $I_L$. A desired current calculation module 340 determines a compensation current $I_P$ to be produced by the first CMI 230 based on $I_C$ from the line current calculation module 330 and $I_L$. For example only, the desired current calculation module 340 may calculate $I_P$ by subtracting $I_C$ from $I_L$. A current feedback control module 350 generates gate signals for the first CMI 230 based on the desired compensation current $I_P$ from the desired current calculation module 340 and a measured value of $I_P$. The current feedback control module 350 adjusts the gate signals to minimize the difference, in both magnitude and phase, between the measured and desired values of $I_P$. Similarly to the gate signals for the second CMI 234, the gate signals for the first CMI 230 may be applied to gate terminals and/or to other control terminals, such as base terminals, depending on the components of the first CMI 230.

Referring now to FIGS. 7A-7C, example UPFC arrangements for three-phase systems are shown. In FIG. 7A, three CMIs 378-1, 378-2, and 378-3 (collectively, CMIs 378) are connected between three phases, respectively, of an output three-phase source and a common node. The common node may be connected to a common potential, such as ground or neutral. Three CMIs 380-1, 380-2, and 380-3 (collectively, CMIs 380) are connected in series between three phases, respectively, of an input three-phase source and the three phases, respectively, of the output three-phase source.

In FIG. 7B, the CMIs 380 may be arranged similarly to FIG. 7A. Meanwhile, the CMIs 378 may each have a first terminal connected to a respective one of the phases of the output three-phase source and a second terminal connected to a first terminal of another one of the CMIs 378. Meanwhile, in FIG. 7C, the CMIs 380 are arranged similarly to those of FIGS. 7A and 7B, while the CMIs 378 are omitted. Alternatively, the CMIs 378 may be included but caused to sink approximately zero current.

Referring now to FIG. 8, a flowchart depicts example control of first and second CMIs of a UPFC according to the principles of the present disclosure. Control begins at 602, where control determines a desired real power for transmission through the UPFC. Control continues at 606 where control determines a desired reactive power for transmission through the UPFC. Control continues at 610, where control determines a voltage reference based on the desired real power of 602 and the desired reactive power of 606.

Control continues at 614, where control begins generating second gate signals for the second CMI. The second gate signals are synchronized with a grid synchronization signal and are controlled to produce the voltage reference across the second CMI. Control continues at 618, where the second CMI is controlled with the second gate signals. Generating the second gate signals at 614 and controlling using the second gate signals at 618 may continue even as other actions of FIG. 8 are being performed.

Control continues at 622 where a reference current is determined based on the reference voltage, sending voltage at the sending source, and transmission line current. Control continues at 626, where a compensation current is determined based on the transmission line current and the reference current. Control continues at 630 where first gate signals are generated based on the desired compensation current. Control continues at 634 where the first CMI is controlled using the first gate signals. The generating and controlling of 630 and 634 may continue even as other actions of FIG. 8 are performed. Control continues at 638, where actual compensation current is measured. Control continues at 642, where control adjusts the first gate signals to minimize the difference between the desired compensation current and the actual compensation current. Control then returns to 602.

Referring now to FIG. 9A, a converter that converts between DC and AC is presented. An AC signal is received or transmitted at terminals Y1 and Y2. A converter is formed by two similar legs 704 and 708. Using leg 704 as a representative, AC terminal Y1 is connected between a first inductor 710 and a second inductor 712. The inductors 710 and 712 can be built on a single core 714 to reduce the size and weight of the inductors 710 and 712. An opposite terminal of the inductor 710 is connected to a CMI 716, while an opposite terminal of the inductor 712 is connected to a CMI 718. The CMI 716 may be referred to as an upper phase leg while the CMI 718 may be referred to as a lower phase leg.

As described above, the CMIs 716 and 718 may be formed from multiple bridge modules. The CMI 716 is connected between a positive DC terminal labeled P and the inductor 710. The CMI 718 is connected between the inductor 712 and a negative DC terminal labeled N. The leg 708 may be arranged similarly to the leg 704 and include similar components.

For purposes of illustration, each of the bridge modules of the CMI 716 and the CMI 718 can be implemented using any of the bridge modules 400, 440, 480, or 520 (of FIGS. 1B-1E, respectively). The CMI 716 can therefore produce any voltage level from $-n*V_{DC}$ to $n*V_{DC}$ or from zero to $n*V_{DC}$ in increments of $V_{DC}$. Similarly, the CMI 718 can produce any voltage from $-n*V_{DC}$ to $n*V_{DC}$ or from zero to $n*V_{DC}$ in increments of $V_{DC}$.

Assuming that a DC voltage between DC terminals P and N is equal to $n*V_{DC}$, the AC terminal Y1 can be set to any arbitrary voltage between $-n*V_{DC}$ and $n*V_{DC}$ or between zero and $n*V_{DC}$. If the desired voltage is, for example, $x*V_{DC}$, where x is an integer between zero and n inclusive, the CMI 718 can generate the voltage $x*V_{DC}$, while the CMI 716 generates the voltage $(n-x)*V_{DC}$. As a result, any arbitrary AC waveform can be produced from the DC power supply.

The opposite conversion is also possible, in which AC is converted to DC. The AC line Y1 is varying and the CMIs 716 and 718 are adjusted based on the voltage of Y1 to keep the voltage between the DC terminals P and N approximately constant. As the voltage at Y1 increases, the voltage across the CMI 716 is reduced, and vice versa. Similarly, as the voltage at Y1 decreases, the voltage across the CMI 718 is reduced, and vice versa.

There may be ripple with a peak-to-peak value of $V_{DC}$ on the DC voltage as a result of the granularity of control (multiples of $V_{DC}$) of the CMIs 716 and 718. The granularity can be increased by adding additional bridge modules to each CMI. Similarly, an AC waveform created from a DC source may exhibit step-like characteristics, mitigated by the inductors 710 and 712, based on the granularity of voltage control. These same principles can apply to leg 708 and to each leg of a three-phase system, such as is shown in FIG. 9B.

Referring now to FIG. 9B, a converter that converts between three-phase AC and DC is presented. The converter includes legs 750, 752, and 754, which may each be similar to the leg 704 of FIG. 9A. Each of the legs 750, 752, and 754 receive a corresponding phase of a three-phase AC line. The legs 750, 752, and 754 are connected between positive and negative DC terminals labeled P and N. Depending on how the CMIs are controlled, power can either be converted from DC to AC or from AC to DC.

Referring now to FIG. 9C, an AC to DC to AC conversion system is shown. The converter is formed by connecting two converters, such as two copies of the converter shown in FIG. 9B, back-to-back. A first converter 780 is connected to a three-phase line where the three phases are labeled Y1, Y2, and Y3. A second converter 782 is connected to another three-phase line where the three phases are labeled Y4, Y5, and Y6. The DC terminals of the converters 780 and 782 are connected to each other and act as a DC bus. The conversion system of FIG. 9C may be used to convert AC power from one frequency to another, from one voltage to another, and/or from one phase shift to another.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

What is claimed is:

1. A power control device comprising:
   a first terminal;
   a second terminal connected to a transmission line;
   a first cascade multilevel inverter (CMI) connected to the second terminal;
   a second CMI connected in series between the first terminal and the second terminal; and
   a control module that controls the first CMI to cause a voltage phasor of the first CMI and a current phasor of the first CMI to approach a perpendicular angle to each other.

2. The power control device of claim 1 wherein the control module controls the first CMI to regulate average real power into and out from the second CMI.

3. The power control device of claim 2 wherein the control module controls the first CMI to apply a current to the second terminal to regulate average real power into and out from the second CMI.

4. The power control device of claim 3 wherein the control module (i) calculates a compensation current to regulate the average real power into and out from both the second CMI and the first CMI and (ii) controls the first CMI to apply the compensation current.

5. The power control device of claim 2 wherein the control module controls the second CMI to provide a commanded real power and a commanded reactive power from the first terminal to the second terminal.

6. The power control device of claim 2 wherein the control module controls the second CMI to provide a commanded real power and a commanded reactive power from the second terminal to the first terminal.

7. The power control device of claim 1 wherein the control module controls the first CMI to cause (i) the voltage phasor of the first CMI and the current phasor of the first CMI to approach a perpendicular angle to each other and (ii) a voltage phasor of the second CMI and a current phasor of the second CMI to approach a perpendicular angle to each other.

8. The power control device of claim 1 wherein the control module (i) determines a reference voltage based on a commanded real power and a commanded reactive power and (ii) controls the second CMI to create the reference voltage across the second CMI.

9. The power control device of claim 8 wherein the control module controls the second CMI in synchronization with an electrical grid to which the power control device is connected.

10. The power control device of claim 8 wherein the control module (i) determines a desired compensation current and (ii) controls the first CMI to generate the desired compensation current.

11. The power control device of claim 10 wherein the control module measures a current through the first CMI and controls the first CMI to reduce a difference between the measured current through the first CMI and the desired compensation current.

12. The power control device of claim 10 wherein the control module determines the desired compensation current based on a current through the transmission line and a current through the second CMI.

13. The power control device of claim 12 wherein the control module calculates the current through the second CMI based on the reference voltage, a voltage at the first terminal, and the current through the transmission line.

14. The power control device of claim 1 wherein the first CMI includes a plurality of bridge modules connected in series, wherein each of the plurality of bridge modules (i) has a first terminal and a second terminal and (ii) is controllable to produce one of a plurality of voltages between the first and second terminals of the bridge module.

15. The power control device of claim 14 wherein each of the plurality of bridge modules is controllable to produce one of two voltages between the first and second terminals of the bridge module.

16. The power control device of claim 1 wherein the second CMI includes a plurality of bridge modules connected in series, wherein each of the plurality of bridge modules has a first terminal and a second terminal and is controllable to produce one of a plurality of voltages between the first and second terminals of the bridge module.

17. The power control device of claim 1 wherein the first CMI is controlled to source zero current to the second terminal and sink zero current from the second terminal.

18. The power control device of claim 1 wherein the control module controls the first CMI to generate a desired reactive power into the second terminal.

19. A method of operating a power control device, the method comprising:
   controlling a first cascade multilevel inverter (CMI) to (i) regulate average real power dissipated into and out from the first CMI and (ii) regulate average real power into and out from a second CMI;
   controlling the second CMI to provide a commanded real power and a commanded reactive power from a first terminal of the power control device to a second terminal of the power control device, wherein the second CMI is connected in series between the first terminal and the second terminal, and wherein the first CMI is connected to the second terminal;

determining a reference voltage based on the commanded real power and the commanded reactive power; and controlling the second CMI to create the reference voltage across the second CMI.

20. The method of claim 19 further comprising:

calculating a compensation current to regulate the average real power into and out from both the second CMI and the first CMI; and controlling the first CMI to apply the compensation current to the second terminal.

21. The method of claim 19 further comprising selectively controlling the second CMI to provide the commanded real power and the commanded reactive power from the second terminal to the first terminal.

22. The method of claim 19 further comprising controlling the first CMI to cause a voltage phasor of the first CMI and a current phasor of the first CMI to approach a perpendicular angle to each other.

23. The method of claim 22 further comprising controlling the first CMI to cause (i) the voltage phasor of the first CMI and the current phasor of the first CMI to approach a perpendicular angle to each other and (ii) a voltage phasor of the second CMI and a current phasor of the second CMI to approach a perpendicular angle to each other.

24. The method of claim 19 further comprising controlling the second CMI in synchronization with an electrical grid to which the power control device is connected.

25. The method of claim 19 further comprising:

determining a desired compensation current; and controlling the first CMI to generate the desired compensation current.

26. The method of claim 25 further comprising:

measuring a current through the first CMI; and controlling the first CMI to reduce a difference between the measured current through the first CMI and the desired compensation current.

27. The method of claim 25 further comprising determining the desired compensation current based on (i) a current through a transmission line connected to the second terminal and (ii) a current through the second CMI.

28. The method of claim 27 further comprising calculating the current through the second CMI based on the reference voltage, a voltage at the first terminal, and the current through the transmission line.

29. The method of claim 19 wherein:

the first CMI includes a plurality of bridge modules connected in series, wherein each of the plurality of bridge modules has a first terminal and a second terminal and is controllable to produce one of a plurality of voltages between the first and second terminals of the bridge module; and controlling the first CMI includes selecting one of the plurality of voltages for each of the plurality of bridge modules.

30. The method of claim 19 wherein:

the second CMI includes a plurality of bridge modules connected in series, wherein each of the plurality of bridge modules has a first terminal and a second terminal and is controllable to produce one of a plurality of voltages between the first and second terminals of the bridge module; and controlling the second CMI includes selecting one of the plurality of voltages for each of the plurality of bridge modules.

31. The method of claim 19 further comprising controlling the first CMI to generate a desired reactive power into the second terminal.

32. A power control device comprising:

a first cascade multilevel inverter (CMI) connected in series between a first terminal of a first 3-phase line and a first terminal of a second 3-phase line;

a second CMI connected in series between a second terminal of the first 3-phase line and a second terminal of the second 3-phase line;

a third CMI connected in series between a third terminal of the first 3-phase line and a third terminal of the second 3-phase line;

a fourth CMI having a first terminal connected to the first terminal of the second 3-phase line;

a fifth CMI having a first terminal connected to the second terminal of the second 3-phase line; and a sixth CMI having a first terminal connected to the third terminal of the second 3-phase line, wherein:

the fourth CMI has a second terminal that is connected to the first terminal of the fifth CMI, the fifth CMI has a second terminal that is connected to the first terminal of the sixth CMI, and the sixth CMI has a second terminal that is connected to the first terminal of the fourth CMI.

33. A power control device comprising:

a first cascade multilevel inverter (CMI) connected in series between a first terminal of a first 3-phase line and a first terminal of a second 3-phase line;

a second CMI connected in series between a second terminal of the first 3-phase line and a second terminal of the second 3-phase line;

a third CMI connected in series between a third terminal of the first 3-phase line and a third terminal of the second 3-phase line;

a fourth CMI having a first terminal connected to the first terminal of the second 3-phase line;

a fifth CMI having a first terminal connected to the second terminal of the second 3-phase line; and a sixth CMI having a first terminal connected to the third terminal of the second 3-phase line, wherein the fourth CMI has a second terminal that is connected to a second terminal of the fifth CMI and a second terminal of the sixth CMI.

34. The power control device of claim 33 wherein the second terminals of the fourth, fifth, and sixth CMIs are connected to a reference potential.

35. A power control device comprising:

a first cascade multilevel inverter (CMI) connected in series between a first terminal of a first 3-phase AC line and a first terminal of a second 3-phase AC line;

a second CMI connected in series between a second terminal of the first 3-phase AC line and a second terminal of the second 3-phase AC line;

a third CMI connected in series between a third terminal of the first 3-phase AC line and a third terminal of the second 3-phase AC line;

a fourth CMI having a first terminal connected to the first terminal of the second 3-phase AC line;

a fifth CMI having a first terminal connected to the second terminal of the second 3-phase AC line; and a sixth CMI having a first terminal connected to the third terminal of the second 3-phase AC line, wherein each CMI of the first CMI, the second CMI, the third CMI, the fourth CMI, the fifth CMI, and the sixth CMI comprises:

a plurality of bridge modules connected in series, wherein each of the plurality of bridge modules has a first terminal and a second terminal and is controllable to produce one of a plurality of voltages between the first and second terminals of the bridge module.

* * * * *